United States Patent
Lenhardt et al.

(10) Patent No.: US 10,788,325 B1
(45) Date of Patent: Sep. 29, 2020

(54) SYSTEMS AND METHODS FOR HYBRID GRAPH AND GRID THREE-DIMENSIONAL ROUTING

(71) Applicant: Rockwell Collins, Inc., Cedar Rapids, IA (US)

(72) Inventors: Paul A. Lenhardt, Cedar Rapids, IA (US); Jason J. Jakusz, Cedar Rapids, IA (US); Titus N. Thompson, Marion, IA (US); James W. Toothaker, Cedar Rapids, IA (US); Joseph C. Diner, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 221 days.

(21) Appl. No.: 15/955,202

(22) Filed: Apr. 17, 2018

(51) Int. Cl.
*G01C 21/20* (2006.01)
*B64D 43/00* (2006.01)

(52) U.S. Cl.
CPC ............ *G01C 21/20* (2013.01); *B64D 43/00* (2013.01)

(58) Field of Classification Search
CPC ................................. G01C 21/20; B64D 43/00
See application file for complete search history.

(56) References Cited

U.S. PATENT DOCUMENTS

| | | | | |
|---|---|---|---|---|
| 4,812,990 A | * | 3/1989 | Adams | G06F 30/18 701/3 |
| 6,148,259 A | * | 11/2000 | Hagelauer | G05D 1/0005 701/122 |
| 8,843,303 B1 | * | 9/2014 | Young | G08G 5/0039 701/122 |
| 9,476,723 B1 | * | 10/2016 | Seibert | G01C 21/3446 |
| 10,347,139 B2 | * | 7/2019 | Kohn-Rich | G05D 1/042 |
| 2004/0054549 A1 | * | 3/2004 | Chittenden | G01C 21/20 705/338 |
| 2008/0300738 A1 | * | 12/2008 | Coulmeau | G01C 21/20 701/3 |
| 2010/0211312 A1 | * | 8/2010 | Ginsberg | G01C 21/00 701/533 |
| 2018/0268720 A1 | * | 9/2018 | Sharma | G08G 5/0034 |
| 2019/0265705 A1 | * | 8/2019 | Zhang | B64C 39/024 |

* cited by examiner

*Primary Examiner* — Hussein Elchanti
(74) *Attorney, Agent, or Firm* — Suiter Swantz pc llo

(57) ABSTRACT

A navigation system is configured to identify a current location and a destination location of an airborne platform, identify a current cell in which the current location is located; identify a plurality of current neighbors associated with the current cell; calculate, for a first path from the current location to the destination location through a first current neighbor of the plurality of current neighbors, a first value of an objective function, the first value depending on whether the first path includes a predetermined navigational node; calculate, for a second path from the current location to the destination location through a second current neighbor of the plurality of current neighbors, a second value of the objective function depending on whether the second path includes a predetermined navigational node; and output the current neighbor and/or path that satisfies an objective condition based on the values.

20 Claims, 6 Drawing Sheets

SYSTEMS AND METHODS FOR HYBRID GRAPH AND GRID THREE-DIMENSIONAL ROUTING

BACKGROUND

The present disclosure generally relates to navigation systems. More particularly, the present disclosure relates to systems and methods for navigation systems using hybrid graph and three-dimensional routing.

In existing systems for navigational routing, a grid may be used to discretize a space to be travelled through into cells and calculate paths through the cells. However, existing grid-based navigation systems typically identify suboptimal solutions paths that are unable to use predetermined waypoints and airways, and may have a lower likelihood of receiving approval for use. In addition, while some systems can navigate through a graph of predetermined waypoints and airways (rather than using a grid), such systems typically fail to converge to appropriate solutions, particularly when attempting to avoid obstacles or searching for solutions when at a distance from predetermined waypoints and airways.

SUMMARY

In one aspect, the inventive concepts disclosed herein are directed to a system. The system includes a navigation database and a navigation engine. The navigation database includes three-dimensional spatial data corresponding to a plurality of cells into which the three-dimensional spatial data is divided, each cell representing a three-dimensional space; a graph indicating a plurality of locations of predetermined navigational nodes and a plurality of locations of predetermined airways, each predetermined airway connecting at least two predetermined navigational nodes; and a plurality of predetermined associations, each predetermined association associating a corresponding cell to at least one of (1) each predetermined navigational node for which the corresponding location is located in the three-dimensional space represented by the cell or (2) at least one predetermined navigational node connected by a predetermined airway for which the corresponding location is located in the three-dimensional space represented by the cell. The navigation engine is configured to identify a current location and a destination location of an airborne platform; identify a current cell in which the current location is located; identify a plurality of current neighbors associated with the current cell, wherein the plurality of current neighbors include each cell directly adjacent to the current cell and each predetermined navigational node associated to the current cell by the plurality of the predetermined associations; calculate, for a first path from the current location to the destination location through a first current neighbor of the plurality of current neighbors, a first value of an objective function, wherein calculating the first value includes one of (1) assigning a first cost to the first path if the first path includes one or more predetermined navigational nodes or (2) assigning a second cost different than the first cost to the first path if the first path does not include one or more predetermined navigational nodes; calculate, for a second path from the current location to the destination location through a second current neighbor of the plurality of current neighbors, a second value of the objective function, wherein calculating the second value includes one of (1) assigning a third cost to the second path if the second path includes one or more predetermined navigational nodes or (2) assigning a fourth cost different than the third cost to the second path if the second path does not include one or more predetermined navigational nodes; compare the first value to the second value to determine whether the first path or the second path satisfies an objective condition; and output (1) a least one of the first path or the first current neighbor if the first path satisfies the objective condition or (2) at least one of the second path or the second current neighbor if the second path satisfies the objective condition.

In a further aspect, the inventive concepts disclosed herein are directed to a method. The method includes identifying a current location and a destination location of an airborne platform; identifying a current cell in which the current location is located from a plurality of cells, each cell representing a three-dimensional space based on three-dimensional spatial data divided into the plurality of cells; identifying a plurality of current neighbors associated with the current cell, wherein the plurality of current neighbors include each cell directly adjacent to the current cell and each predetermined navigational node associated to the current cell by a plurality of the predetermined associations, each predetermined association associating a corresponding cell to at least one of (1) each predetermined navigational node for which a corresponding location is located in the three-dimensional space represented by the cell or (2) at least one predetermined navigational node connected by a predetermined airway for which the corresponding location is located in the three-dimensional space represented by the cell; calculating, for a first path from the current location to the destination location through a first current neighbor of the plurality of current neighbors, a first value of an objective function, wherein calculating the first value includes one of (1) assigning a first cost to the first path if the first path includes one or more predetermined navigational nodes or (2) assigning a second cost different than the first cost to the first path if the first path does not include one or more predetermined navigational nodes; calculating, for a second path from the current location to the destination location through a second current neighbor of the plurality of current neighbors, a second value of the objective function, wherein calculating the second value includes one of (1) assigning a third cost to the second path if the second path includes one or more predetermined navigational nodes or (2) assigning a fourth cost different than the third cost to the second path if the second path does not include one or more predetermined navigational nodes; comparing the first value to the second value to determine whether the first path or the second path satisfies an objective condition; and outputting (1) a least one of the first path or the first current neighbor if the first path satisfies the objective condition or (2) at least one of the second path or the second current neighbor if the second path satisfies the objective condition.

In a further aspect, the inventive concepts disclosed herein are directed to a non-transitory computer-readable medium comprising computer-executable instructions. When executed by one or more processors, the instructions cause the one or more processors to identify a current location and a destination location of an airborne platform; identify a current cell in which the current location is located from a plurality of cells, each cell representing a three-dimensional space based on three-dimensional spatial data divided into the plurality of cells; identify a plurality of current neighbors associated with the current cell, wherein the plurality of current neighbors include each cell directly adjacent to the current cell and each predetermined navigational node associated to the current cell by a plurality of the predetermined associations, each predetermined association associating a corresponding cell to at least one of (1) each predetermined navigational node for which a corresponding location is located in the three-dimensional space represented by the cell or (2) at least one predetermined navigational node connected by a predetermined airway for which the corresponding location is located in the three-dimensional space represented by the cell; calculate, for a first path from the current location to the destination location through a first current neighbor of the plurality of current neighbors, a first value of an objective function, wherein calculating the first value includes one of (1) assigning a first cost to the first path if the first path includes one or more predetermined navigational nodes or (2) assigning a second cost different than the first cost to the first path if the first path does not include one or more predetermined navigational nodes; calculate, for a second path from the current location to the destination location through a second current neighbor of the plurality of current neighbors, a second value of the objective function, wherein calculating the second value includes one of (1) assigning a third cost to the second path if the second path includes one or more predetermined navigational nodes or (2) assigning a fourth cost different than the third cost to the second path if the second path does not include one or more predetermined navigational nodes; compare the first value to the second value to determine whether the first path or the second path satisfies an objective condition; and output (1) a least one of the first path or the first current neighbor if the first path satisfies the objective condition or (2) at least one of the second path or the second current neighbor if the second path satisfies the objective condition.

DETAILED DESCRIPTION

Figure 1:
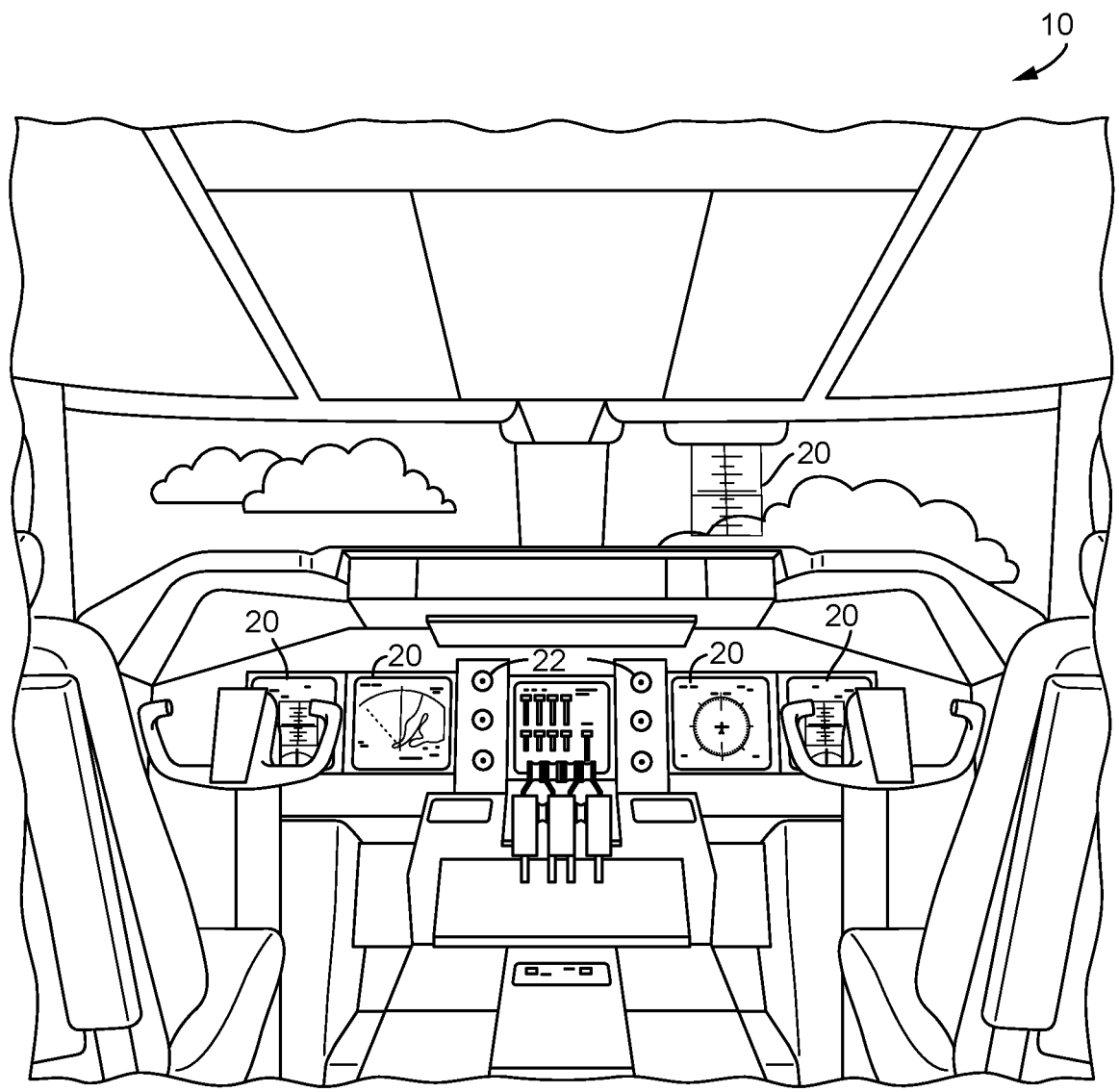
FIG. 1 is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for navigation systems using hybrid graph and grid three-dimensional routing. The inventive concepts disclosed herein can be utilized in various types of electronic avionics applications for airborne platforms (e.g., fixed wing aircraft, rotary wing aircraft), including but not limited to flight control and autopilot systems, navigation systems, flight display systems, communications systems, and radar systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a navigation database and a navigation engine. The navigation database includes three-dimensional spatial data corresponding to a plurality of cells into which the three-dimensional spatial data is divided, each cell representing a three-dimensional space; a graph indicating a plurality of locations of predetermined navigational nodes and a plurality of locations of predetermined airways, each predetermined airway connecting at least two predetermined navigational nodes; and a plurality of predetermined associations, each predetermined association associating a corresponding cell to at least one of (1) each predetermined navigational node for which the corresponding location is located in the three-dimensional space represented by the cell or (2) at least one predetermined navigational node connected by a predetermined airway for which the corresponding location is located in the three-dimensional space represented by the cell. The navigation engine is configured to identify a current location and a destination location of an airborne platform; identify a current cell in which the current location is located; identify a plurality of current neighbors associated with the current cell, wherein the plurality of current neighbors include each cell directly adjacent to the current cell and each predetermined navigational node associated to the current cell by the plurality of the predetermined associations; calculate, for a first path from the current location to the destination location through a first current neighbor of the plurality of current neighbors, a first value of an objective function, wherein calculating the first value includes one of (1) assigning a first cost to the first path if the first path includes one or more predetermined navigational nodes or (2) assigning a second cost different than the first cost to the first path if the first path does not include one or more predetermined navigational nodes; calculate, for a second path from the current location to the destination location through a second current neighbor of the plurality of current neighbors, a second value of the objective function, wherein calculating the second value includes one of (1) assigning a third cost to the second path if the second path includes one or more predetermined navigational nodes or (2) assigning a fourth cost different than the third cost to the second path if the second path does not include one or more predetermined navigational nodes; compare the first value to the second value to determine whether the first path or the second path satisfies an objective condition; and output (1) a least one of the first path or the first current neighbor if the first path satisfies the objective condition or (2) at least one of the second path or the second current neighbor if the second path satisfies the objective condition.

The system can be integrated with an airborne platform or other platform as described herein. For example, the navigation systems described herein can be associated with an aircraft cockpit display of the airborne platform.

Systems manufactured in accordance with the inventive concepts disclosed herein can improve operation of avionics systems and navigation technology by more effectively finding navigation routing solutions that are safe, avoid obstacles, have a higher likelihood of being approved (e.g., by an air traffic controller), and enable re-routing in a manner that uses desired predetermined waypoints and airways (without failing to achieve navigation solutions). As such, the inventive concepts disclosed herein provide a technical improvement in generating navigational solutions.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, HUDs with or without a projector, head up guidance systems, wearable displays, watches, Google Glass® or other HWD systems. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, a sensor system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization generated based on an indication of a runway surface condition, and display the image information.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 2:
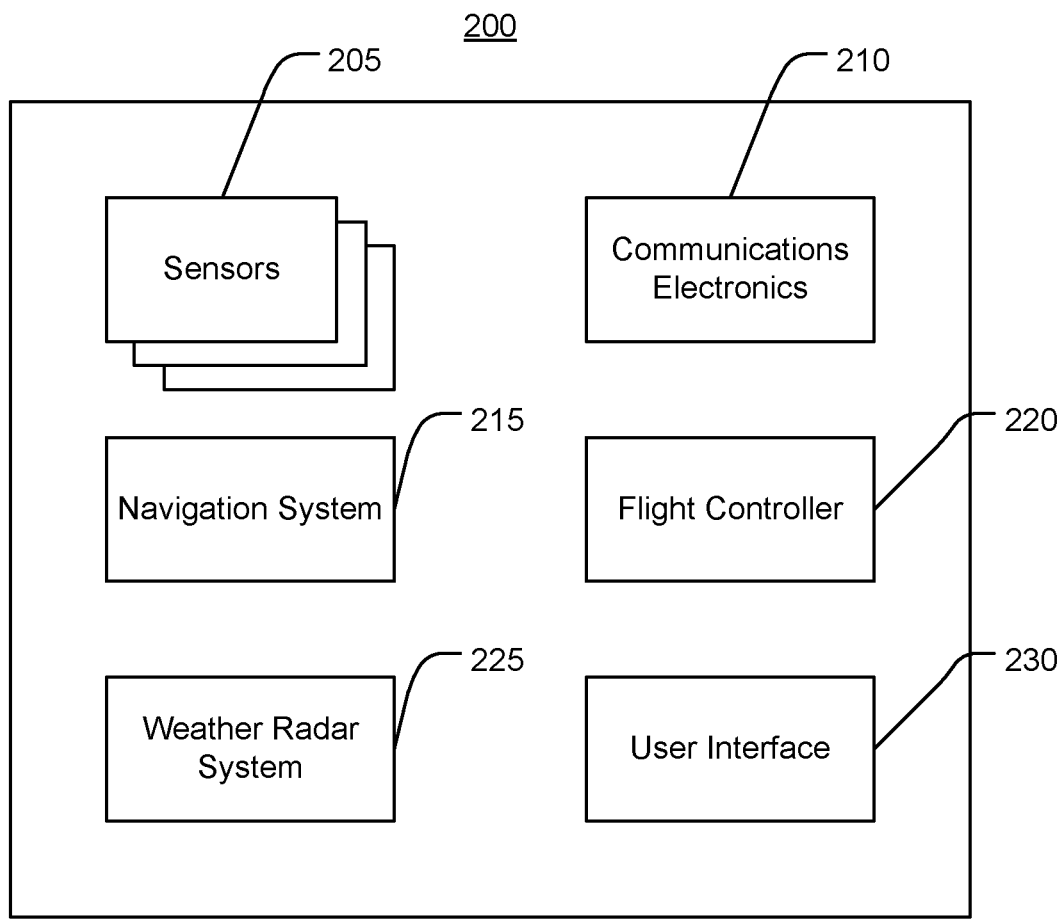
FIG. 2 is a block diagram of an exemplary embodiment of an aircraft electronic system according to the inventive concepts disclosed herein.

Referring now to FIG. 2, an avionics system 200 is shown according to an exemplary embodiment of the inventive concepts disclosed herein. The avionics system 200 includes one or more sensors 205, communications electronics 210, a navigation system 215, a flight controller 220, a weather radar system 225, and a user interface 230.

The one or more sensors 205 can be configured to detect position, speed, altitude, orientation, and other state parameters of the platform implementing the sensor(s) 205, as well as environmental parameters such as temperature, air pressure, and wind speed. The sensor(s) 205 may include at least one of an inertial measurement unit (which may include one or more gyroscopes and one or more accelerometers, such as three gyroscopes and three accelerometers), an air data sensor (e.g., sensor(s) configured to detect and output an indication of static pressure), or a magnetic compass.

The communications electronics 210 are configured to receive and transmit data. The communications electronics 210 can include receiver electronics and transmitter electronics. The communications electronics 210 can include a radio configured for radio frequency communication. The communications electronics 210 can include a datalink radio. The communications electronics 210 can enable the navigation system 215 to receive and transmit navigation information from/to remote platforms.

The navigation system 215 can generate navigation routes and can modify navigation routes in real time in response to obstacles and changes in safety, such as based on weather information. The navigation system 215 can incorporate features of the navigation system 300 described below with reference to FIG. 3.

The flight controller 220 is configured to generate control instructions for controlling movement of the platform, including but not limited to thrust and attitude instructions. The flight controller 220 can generate control instructions based on user input and/or information received from the navigation system 215. The flight controller 220 can include at least one of an autopilot or an autothrottle.

The weather radar system 225 can use transmit radar signals, receive radar returns, and determine weather information based on the received radar returns.

The user interface 230 can display information generated by various components of the avionics system 200. The user interface 230 can incorporate features of the flight displays 20 and the UI elements described with reference to FIG. 1.

Figure 3:
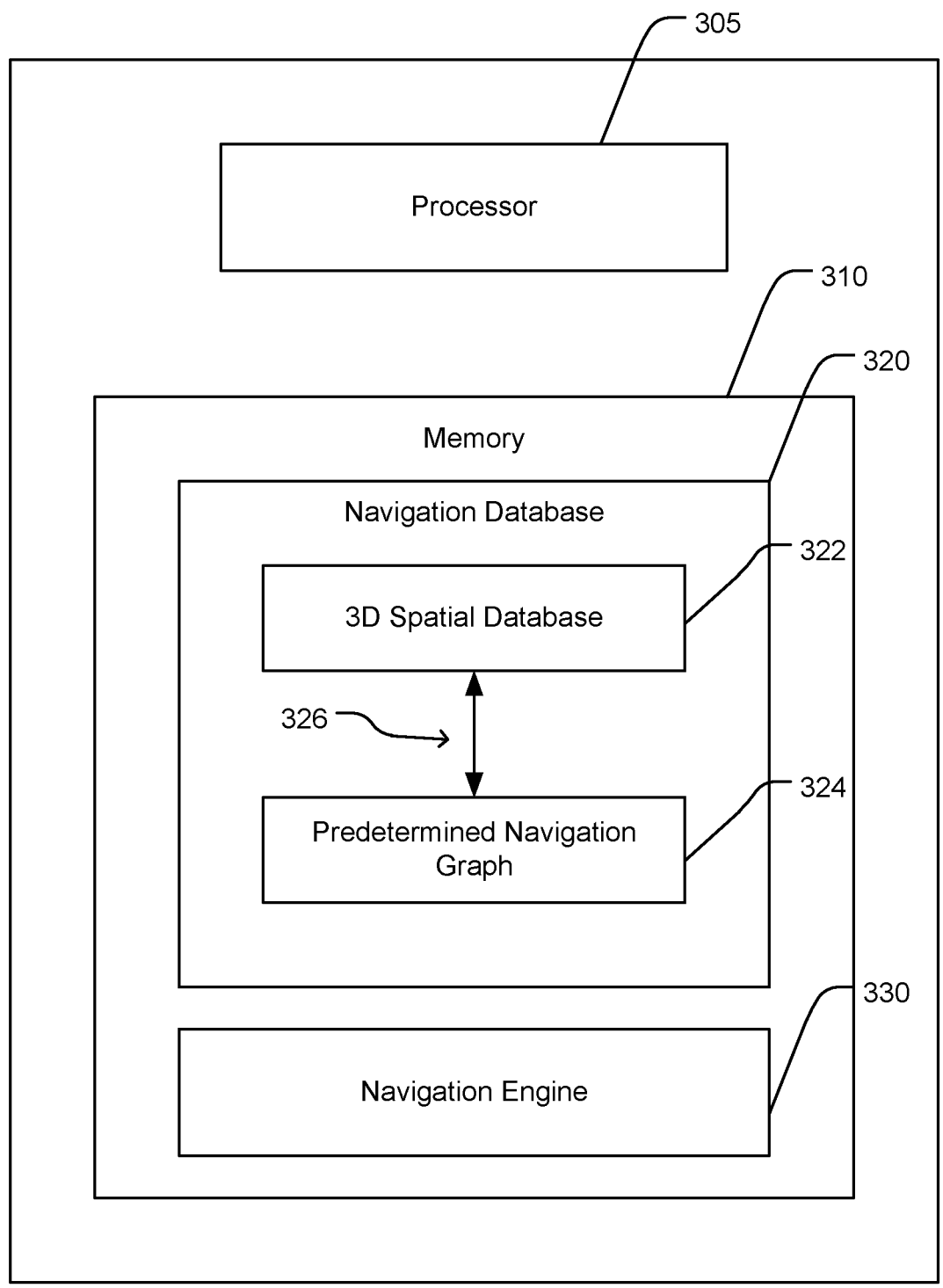
FIG. 3 is a block diagram of an exemplary embodiment of a navigation system for using hybrid graph and three-dimensional routing according to the inventive concepts disclosed herein.

Referring now to FIG. 3, a navigation system 300 is shown according to an exemplary embodiment of the inventive concepts disclosed herein. The navigation system 300 can incorporate features of and/or be implemented as the navigation system 215 described with reference to FIG. 2. The navigation system 300 includes a processor 305 and a memory 310. The processor 305 may be implemented as a specific purpose processor, an application specific integrated circuit (ASIC), one or more field programmable gate arrays (FPGAs), a group of processing components, or other suitable electronic processing components. The processor 305 may be a distributed computing system or a multi-core processor. The memory 310 is one or more devices (e.g., RAM, ROM, flash memory, hard disk storage) for storing data and computer code for completing and facilitating the various user or client processes, layers, and modules described in the present disclosure. The memory 310 may be or include volatile memory or non-volatile memory and may include database components, object code components, script components, or any other type of information structure for supporting the various activities and information structures of the inventive concepts disclosed herein. The memory 310 is communicably connected to the processor 305 and includes computer code or instruction modules for executing one or more processes described herein. The memory 310 can include various circuits, software engines, and/or modules that cause the processor to execute the systems and methods described herein. The memory may be distributed across disparate devices (e.g., a first device may include navigation database 320 (or components thereof) and a second device may include navigation engine 330).

The memory 310 includes a navigation database 320 and a navigation engine 330. The navigation database 320 includes a three-dimensional spatial database 322, a predetermined navigation graph 324, and a plurality of predetermined associations 326. The three-dimensional spatial database 322 stores three-dimensional spatial data. The three-dimensional spatial data corresponds to a plurality of cells. Each cell can represent a region of three-dimensional space. The cells can be non-overlapping, such that no cell extends within the border of another cell. The cells can be immediately adjacent, such that a border of a first cell at least partially coincides with (e.g., has the same spatial coordinates as) a border of a second cell. The plurality of cells may be represented as a grid, such as described below with further reference to FIG. 4. The cells can be configured such that each point in the three-dimensional space associated with the three-dimensional spatial data is associated with a single cell. For example, where the plurality of cells are configured as 1×1×1 cubic units, a rule can be applied such as "associate the point to the cell having the lesser dimension value in each dimension" to associate the point [1.0, 1.0, 0.0] to a cell extending between [0.0, 0.0, 0.0] and [1.0, 1.0, 1.0], rather than any other cell having a boundary at the point [1.0, 1.0, 0.0]. It will be appreciated that various other rules can be applied to enforce a requirement that each point be associated with a single cell.

The predetermined navigation graph 324 includes a map or other data structure representing a graph of nodes, such as described below with further reference to FIG. 5. The graph includes a plurality of locations of predetermined navigational nodes and a plurality of locations of predetermined airways. Each predetermined airway connects at least two predetermined navigational nodes, and thus may be represented as an edge connecting nodes in the graph. Each location for corresponding nodes and/or or airways may be represented using three-dimensional spatial data in a similar format as for the spatial database 322 (or may be converted to a common format as needed). The graph can allow for connections between predetermined navigational nodes, without requiring three-dimensional space to be fully discretized into cells. The predetermined nodes and airways can represent preferred routes for navigation through space.

In some embodiments, the predetermined navigational nodes can include various types of nodes, such as major nodes, minor nodes, and link nodes. Major nodes can represent the locations of predetermined navigational waypoints. Minor nodes can represent the locations of intersections of predetermined airways (e.g., intersections of edges representing predetermined airways). Link nodes can represent locations along predetermined airways, such as based on the division of the predetermined airways (which may each be initially represented based on the nodes connected by the predetermined airway) into discrete locations—these discrete locations could be used for navigational entry into or exit from the corresponding airway when a current location is not a major node or minor node. The link nodes may be spaced from major and minor nodes. Link nodes may provide new access to enter/exit predetermined navigational nodes not otherwise available to existing grid- or graph-based solutions.

The plurality of predetermined associations 326 associate cells of the three-dimensional spatial database 322 to predetermined navigational nodes (and, to the extent necessary in addition to predetermined navigational nodes, to predetermined airways) of predetermined navigation graph 324. In some embodiments, each predetermined association 326 associates a cell to at least one of (1) each predetermined navigational node for which the corresponding location is located in the three-dimensional space represented by the cell or (2) at least one predetermined navigational node connected by a predetermined airway for which the corresponding location is located in the three-dimensional space represented by the cell. It will be appreciated that a predetermined navigational node (including major nodes, minor nodes, and link nodes) will have a corresponding location located in the three-dimensional space represented by the cell if the coordinates of the predetermined navigational node are located within or on a boundary of the cell. As an illustrative example, if the three-dimensional space is represented in Cartesian coordinates, and a cell represents a cubic region having corners at [1, 0, 0]; [1, 1, 0]; [1, 0, 1]; [1, 1, 1]; [0, 0, 0]; [0, 1, 0]; [0, 0, 1]; and [0, 1, 1], then the predetermined navigational node will have a location located within the cell if the location has an x-coordinate greater than or equal to zero and less than or equal to one; a y-coordinate greater than or equal to zero and less than or equal to one; and a z-coordinate greater than or equal to zero and less than or equal to one. The plurality of predetermined associations 326 can be bi-directional, which can increase computational efficiency. The plurality of predetermined associations 326 can be an ordered and/or sorted array of associations from cells to predetermined navigational nodes, such that a search algorithm executed to retrieve associated elements (e.g., binary search) can efficiently retrieve the desired associated cells or graph nodes.

The navigation engine 330 can receive the navigation database 320 (or components thereof) from a remote source, or can generate the navigation database 320 (or components thereof). For example, the navigation engine 330 can discretize three-dimensional spatial data into the plurality of cells. The navigation engine 330 can discretize the three-dimensional spatial data based on a cell size. The cell size may be adjusted based on factors such as navigational performance and solution quality (which can increase as cell size decreases) and desired computational efficiency (which can increase as cell size decreases). The navigation engine 330 can use an Airborne E* algorithm to generate the plurality of cells (e.g., into a grid or Eldetree).

The navigation engine 330 can generate the plurality of predetermined associations 326, such as by determining whether particular nodes are located in particular cells. The navigation engine 330 can generate the plurality of predetermined associations 326 while discretizing the three-dimensional spatial data into the plurality of cells, which can increase overall computational efficiency. The navigation engine 330 can generate the predetermined navigation graph 324, such as by receiving predetermined navigational waypoints and/or airways and generating major nodes, minor nodes, and link nodes therefrom.

The navigation engine 330 can use the navigation database 320 to generate navigation routes which perform better than existing routes that rely on searching the plurality of cells by also incorporating preferences for routes which use the predetermined navigation graph 324. The navigation engine 330 can identify a current location and a destination location of a platform (e.g., airborne platform). The current location can be determined based on position information received from a position sensor (e.g., a position sensor of sensors 205). The destination location may be stored in navigation database 320 and/or received as user input.

The navigation engine 330 can identify a current cell in which the current location is located. For example, the navigation engine 330 can search the plurality of cells using coordinates corresponding to the current location and spatial data/coordinates used to represent the plurality of cells to identify the current cell.

The navigation engine 330 can identify a plurality of current neighbors associated with the current cell. The current neighbors can include each cell immediately adjacent to the current cell.

The current neighbor cells can include each predetermined navigational node associated to the current cell by the plurality of the predetermined associations. For example, the navigation engine 330 can identify each predetermined navigational node associated to the current cell by executing a search algorithm, based on the current cell, on the plurality of the predetermined associations to retrieve the predetermined navigational node(s) associated to the current cell by the plurality of the predetermined associations.

The navigation engine 330 can calculate values of an objective function to determine comparative costs and/or benefits of following certain paths-depending on which neighbor is travelled through—from the current location to the destination location. The value of the objective function may be indicative of an overall path value (e.g., overall path cost) to the destination location. In some embodiments, the navigation engine 330 calculates, for a first path from the current location to the destination location through a first current neighbor of the plurality of current neighbors, a first value of the objective function.

In some embodiments, calculating the first value includes one of (1) assigning a first cost to the first path if the first path includes one or more predetermined navigational nodes or (2) assigning a second cost different than the first cost to the first path if the first path does not include one or more predetermined navigational nodes. As such, the navigation engine 330 can distinguish the value of pursuing paths depending on whether the paths use predetermined navigational nodes, which may be preferred by users but difficult to effectively use in existing systems. The navigation engine 330 can use various search algorithms, such as A* or Theta*, to search through different potential routes (e.g., paths) based on the values of the objective function. The costs may additionally or alternatively be differently assigned based on which path has more predetermined navigational nodes.

Similarly, the navigation engine 330 can calculate values of the objective function for one or more additional paths through different current neighbors. For example, the navigation engine 330 can calculate, for a second path from the current location to the destination location through a second current neighbor of the plurality of current neighbors, a second value of the objective function. Calculating the second value can include one of (1) assigning a third cost to the second path if the second path includes one or more predetermined navigational nodes or (2) assigning a fourth cost different than the third cost to the second path if the second path does not include one or more predetermined navigational nodes.

Similar values of the objective function can be calculated for any of the remaining current neighbors. The navigation engine 330 (e.g., using a search algorithm) can open states of current neighbors to identify parameters used to calculate neighbor values.

The navigation engine 330 can determine which path to follow based on the calculated values of the objective function, such as to determine the value that satisfies an objective condition. For example, the navigation engine 330 can compare the first value to the second value to determine whether the first path or the second path satisfies an objective condition, and output the one of the first path or the second path satisfying the objective condition. The navigation engine 330 can compare several values for as many of the current neighbors as desired.

It will be appreciated that the objective function and associated objective condition may be defined in a variety of manners, such as based on a function to be maximized (or to be searched for a value greater than a minimum threshold) or minimized (or to be searched for a value less than a maximum threshold). In some embodiments, the objective function is a cost function. As such, the first cost can be less than the second cost, the third cost can less than the fourth cost, and the navigation engine 330 can determine that the first path satisfies the objective condition based on the first value being less than the second value (or vice versa).

The navigation engine 330 can calculate values of the objective function based on various parameters (in addition to whether the path in question includes predetermined navigational node(s)). These parameters can include but are not limited to distance, time, fuel burn, safety, destination conditions (e.g., availability of runways for landing) and weather conditions (which can be received from the weather radar system 225 or another remote source). The navigation engine 330 can assign various weights to the parameters when defining the objective function, and adjust the weights as desired. For example, the navigation engine 330 can adjust the weights based on testing and historical data to ensure that routes through predetermined navigational nodes are preferred to a desired extent. The navigation engine 330 can also adjust the weights based on user input. In addition, calculating the values of the objective function need not require opening states of cells/nodes beyond the current neighbors, such as those closer to the destination location.

When a path is output based on satisfying the objective condition, the navigation engine 330 can continue to calculate values of the objective function based on new neighbors of the current neighbor corresponding to the outputted path. As such, the navigation engine 330 can step through the cells and predetermined navigational nodes to reach the destination location, avoiding obstacles and preferentially using predetermined navigational nodes without being unable to find solutions.

In some embodiments in which the navigation engine 330 implements a Theta* algorithm, the navigation engine 330 can selectively perform path smoothing. Path smoothing may be inherent to Theta* implementation and may be preferred by users for enabling smooth, straight routes, but may interfere with the preferential use of predetermined navigational nodes as disclosed herein. The navigation engine 330 can thus determine whether the current cell is associated with a predetermined navigational node, and execute a smoothing algorithm between the current cell and a selected neighbor cell responsive to (1) the current cell not being associated with the predetermined navigational node and (2) the current cell satisfying a smoothing condition of the Theta* algorithm. Responsive to the current cell being associated with the predetermined navigational node, the navigation engine 330 can cause the Theta* algorithm to generate a new path (to avoid smoothing).

Figure 4:
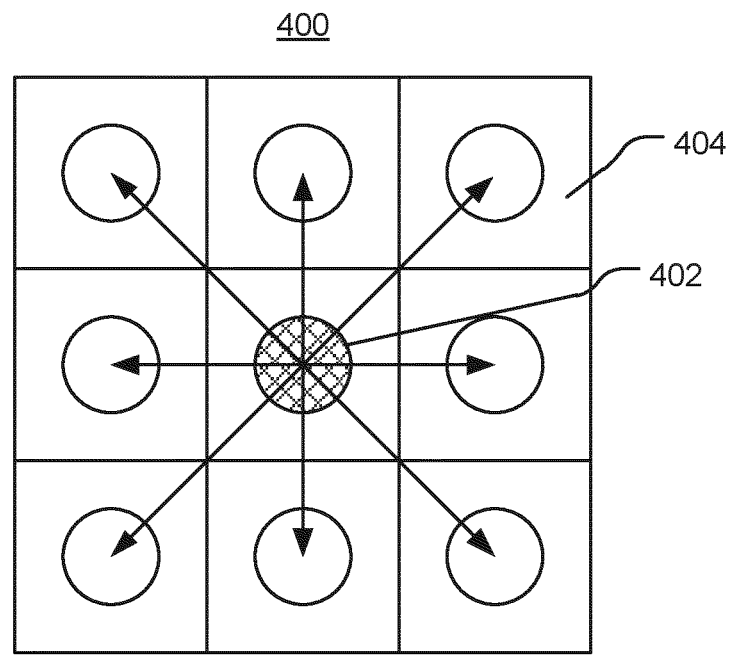
FIG. 4 is a schematic diagram of an exemplary embodiment of a grid according to the inventive concepts disclosed herein.

Referring now to FIG. 4, a schematic diagram of a portion of a grid 400 is shown according to the inventive concepts disclosed herein. The grid 400 includes a plurality of cells including a current cell 402 (in an open state indicated by the shaded circle) corresponding to a current location, and a plurality of current neighbors 404 (each in an unopened state indicated by the open circle) immediately adjacent to the current cell 402. In existing systems that implement grid-only based solutions, determining paths based only on traversing cells 402, 404 can ignore the benefits of predetermined navigational nodes, resulting in sub-optimal solutions.

Figure 5:
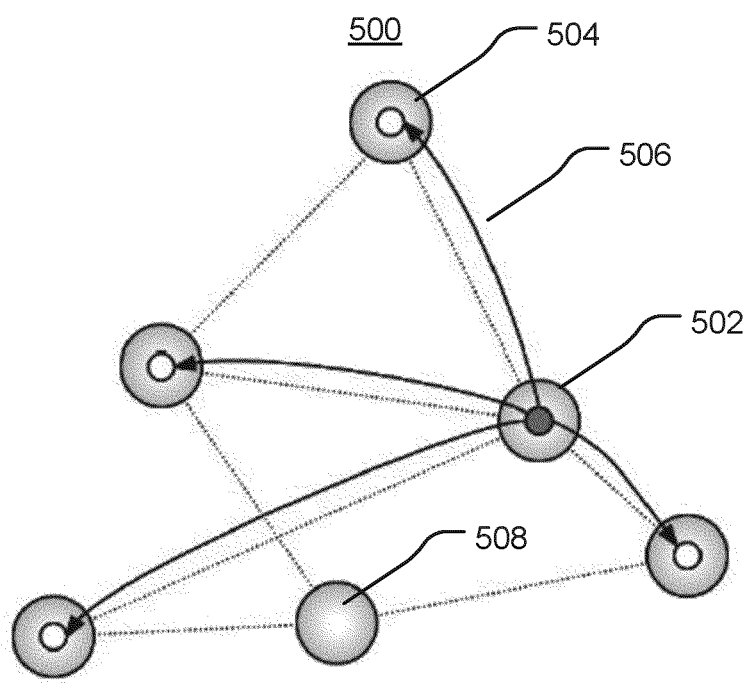
FIG. 5 is a schematic diagram of an exemplary embodiment of a graph according to the inventive concepts disclosed herein.

Referring now to FIG. 5, a schematic diagram of a portion of a graph 500 is shown according to the inventive concepts disclosed herein. The graph 500 includes a plurality of nodes including a current node 502 (in an open state indicated by the shaded circle) corresponding to a current location, and a plurality of current neighbors 504 (each in an unopened state indicated by the open circle) directly connected to the current node 502 by edges (e.g., airways) 506. The graph 500 also includes a remote node 508 not directly connected to the current node 502 (e.g., connected by more than one edge 506). Existing systems that implement graph-based solutions only have a low rate of successfully calculating navigational solutions due to the sparse nature of the graph, particularly when the current location of the platform does not correspond to any graph node, when obstacles arise that block routes between nodes 502, 504, 508.

Figure 6:
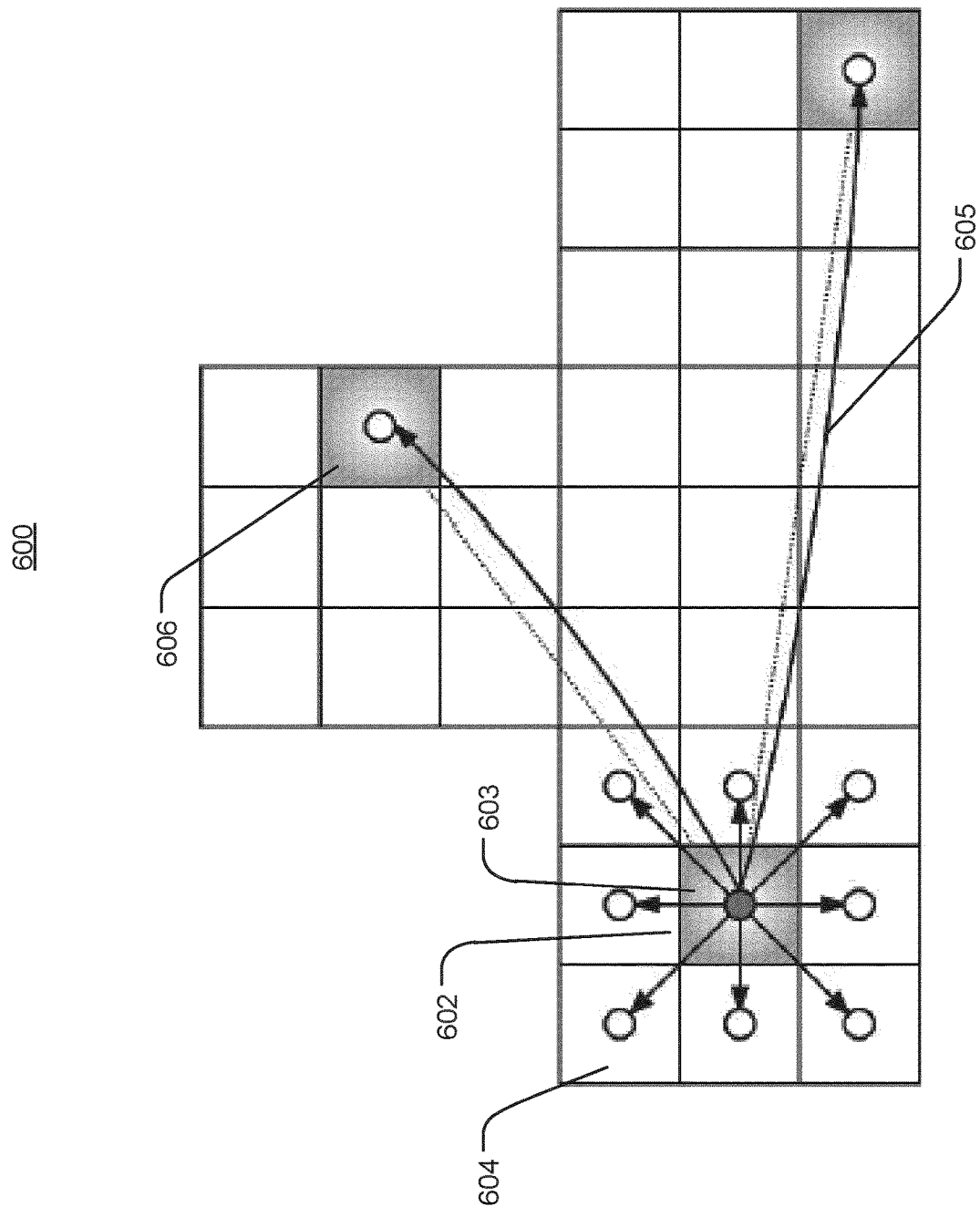
FIG. 6 is a schematic diagram of an exemplary embodiment of a hybrid grid and graph according to the inventive concepts disclosed herein.

Referring now to FIG. 6, a schematic diagram of a portion of a hybrid grid graph 600 is shown according to the inventive concepts disclosed herein. The graph 600 includes a current cell 602, within which a predetermined navigational node 603 is located. The graph 600 includes a plurality of current neighbors including a plurality of neighbor cells 604 immediately adjacent to the current cell 602, and predetermined navigational nodes 606 associated to current cell 602 (e.g., via airways/edges 605, which may be represented using link nodes). The navigation engine 300 can improve upon existing systems by using both grid cells and predetermined navigational nodes as shown in FIG. 6 to calculate navigational route solutions with higher rates of success while maintaining preferences for predetermined navigational nodes/airways.

Figure 7:
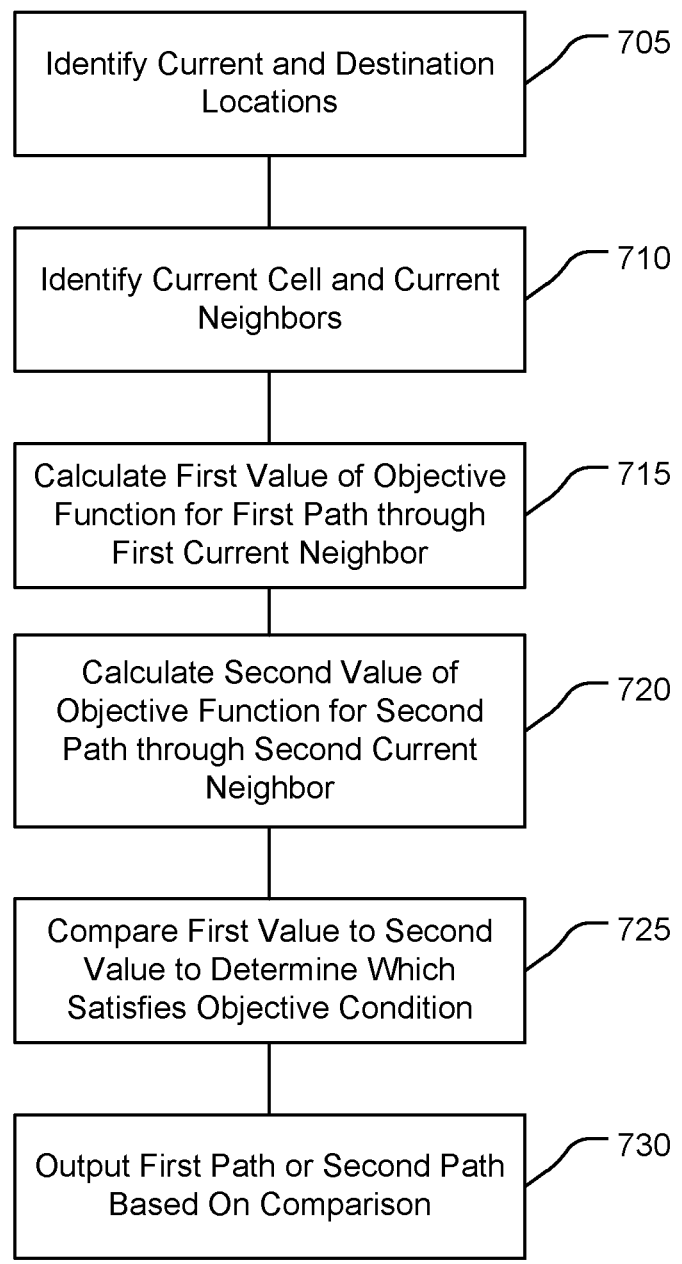
FIG. 7 is a flow chart of an exemplary embodiment of a method for communicating actionable avionics events according to the inventive concepts disclosed herein.

Referring now to FIG. 7, a flow diagram of a method 700 for generating hybrid grid-graph navigation routes is shown according to the inventive concepts disclosed herein. The method can be performed by the systems 200, 300 described herein.

A step (705) may include identifying a current location and a destination location of an airborne platform. The current location can be determined based on position information received from a position sensor. The destination location may be stored in a navigation database and/or received as user input.

A step (710) may include identifying a current cell and current neighbors of the current cell. A plurality of cells, based on discretization of three-dimensional spatial data, can be searched using coordinates corresponding to the current location and spatial data/coordinates used to represent the plurality of cells to identify the current cell. The current neighbors can include each cell immediately adjacent to the current cell. The current neighbor cells can include each predetermined navigational node associated to the current cell by a plurality of the predetermined associations. For example, each predetermined navigational node associated to the current cell can be identified by executing a search algorithm, based on the current cell, on the plurality of the predetermined associations to retrieve the predetermined navigational node(s) associated to the current cell by the plurality of the predetermined associations.

A step (715) may include calculating a first value of an objective function for a first path from the current location to the destination location through a first current neighbor. In some embodiments, calculating the first value includes one of (1) assigning a first cost to the first path if the first path includes one or more predetermined navigational nodes or (2) assigning a second cost different than the first cost to the first path if the first path does not include one or more predetermined navigational nodes.

A step (720) may include calculating a second value of the objective function for a second path from the current location to the destination location through a second current neighbor. In some embodiments, calculating the second value includes one of (1) assigning a third cost to the second path if the second path includes one or more predetermined navigational nodes or (2) assigning a fourth cost different than the third cost to the second path if the second path does not include one or more predetermined navigational nodes.

A step (725) may include comparing the first value to the second value to determine which value/neighbor/node satisfies an objective condition corresponding to the objective function. It will be appreciated that the objective function and associated objective condition may be defined in a variety of manners, such as based on a function to be maximized (or to be searched for a value greater than a minimum threshold) or minimized (or to be searched for a value less than a maximum threshold). In some embodiments, the objective function is a cost function. As such, the first cost can be less than the second cost, the third cost can less than the fourth cost, and the first path can be determined to satisfy the objective condition based on the first value being less than the second value (or vice versa).

A step (730) may include outputting the one of the first path or the second path which satisfies the objective condition. For example, the current neighbor corresponding to the outputted path can be used as a new current cell for stepping through cells to the destination location. The outputted path can be displayed or transmitted to a remote entity.

As will be appreciated from the above, systems and methods for navigation systems using hybrid graph and grid three-dimensional routing according to embodiments of the inventive concepts disclosed herein may improve operation of aircraft and other platforms by generating navigational solutions that take advantage of the granularity provided by grid-based routing and the benefit of using predetermined waypoints and airways as desired by users, thus increasing the likelihood of navigation solutions—including in response to obstacles changing the safety of existing routes and requiring a re-route to be calculated—of successfully being achieved while reducing the likelihood of solutions being identified that would not receive approval for use.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system, comprising:
a navigation database storing:
three-dimensional spatial data corresponding to a plurality of cells into which the three-dimensional spatial data is divided, each cell representing a three-dimensional space;
a graph indicating a plurality of locations of predetermined navigational nodes and a plurality of locations of predetermined airways, each predetermined airway connecting at least two predetermined navigational nodes; and
a plurality of predetermined associations, each predetermined association associating a corresponding cell to at least one of (1) each predetermined navigational node for which the corresponding location is located in the three-dimensional space represented by the cell or (2) at least one predetermined navigational node connected by a predetermined airway to a corresponding location which is located in the three-dimensional space represented by the cell; and
a navigation engine configured to:
identify a current location and a destination location of an airborne platform;
identify a current cell in which the current location is located;
identify a plurality of current neighbor cells associated with the current cell, wherein the plurality of current neighbor cells include each cell directly adjacent to the current cell and each cell containing a predetermined navigational node associated to the current cell by the plurality of the predetermined associations;
calculate, for a first path from the current location to the destination location through a first current neighbor cell of the plurality of current neighbor cells, a first value of an objective function, wherein a first cost is assigned to the first path if the first path includes one or more cells containing predetermined navigational nodes and a second cost different than the first cost is assigned to the first path if the first path does not include one or more cells containing predetermined navigational nodes;

calculate, for a second path from the current location to the destination location through a second current neighbor of the plurality of current neighbors, a second value of the objective function, wherein a third cost is assigned to the second path if the second path includes one or more cells containing predetermined navigational nodes, and a fourth cost different than the third cost is assigned to the second path if the second path does not include one or more cells containing predetermined navigational nodes;

compare the first value to the second value to determine whether the first path or the second path satisfies an objective condition; and output (1) a least one of the first path or the first current neighbor if the first path satisfies the objective condition or (2) at least one of the second path or the second current neighbor if the second path satisfies the objective condition.

2. The system of claim 1, wherein the objective function is a cost function, the first cost is less than the second cost, the third cost is less than the fourth cost, and the navigation engine is configured to determine that the first path satisfies the objective condition based on the first value being less than the second value.

3. The system of claim 1, wherein the navigation engine is configured to extract the plurality of cells from the three-dimensional spatial data such that each cell is a region of three-dimensional space immediately adjacent to corresponding neighbor cells.

4. The system of claim 3, wherein the navigation engine is configured to extract the plurality of cells by executing an airborne E star (E*) algorithm or by using at least one of an Eldetree or a grid.

5. The system of claim 1, wherein the navigation engine is configured to calculate the values of the objective function by executing at least one of an A star (A*) or a Theta star (Theta*) algorithm.

6. The system of claim 5, wherein executing the Theta* algorithm includes determining whether the current cell is associated by the plurality of predetermined associations with one or more predetermined navigational nodes, and executing a smoothing algorithm between the current cell and a selected neighbor cell responsive to (1) the current cell not being associated with the one or more predetermined navigational nodes and (2) the current cell satisfying a smoothing condition of the Theta* algorithm.

7. The system of claim 1, wherein the navigation engine is configured to calculate the values of the objective function further based on at least one of a distance, a time, or a safety.

8. The system of claim 1, wherein the navigation engine is configured to use a bi-directional data structure to associate the predetermined navigational nodes with the plurality of cells, and execute a binary search to retrieve the plurality of neighbor cells.

9. The system of claim 1, wherein the predetermined navigational nodes include at least one of a major node corresponding to a predetermined navigation waypoint or a minor node corresponding to an intersection of at least two predetermined airways.

10. The system of claim 9, wherein the predetermined navigation nodes further comprise a link node spaced from the at least one of the major node or the minor node, the link node indicating a location for entry or exit from a corresponding predetermined airway.

11. The system of claim 1, wherein a location of a particular predetermined navigational node is located within a particular cell if the particular predetermined navigational node is contained within the particular cell or is located on a boundary of the particular cell.

12. A method, comprising:

identifying a current location and a destination location of an airborne platform;

identifying a current cell in which the current location is located from a plurality of cells, each cell representing a three-dimensional space based on three-dimensional spatial data divided into the plurality of cells;

identifying a plurality of current neighbor cells associated with the current cell, wherein the plurality of current neighbor cells include each cell directly adjacent to the current cell and each cell containing a predetermined navigational node associated to the current cell by a plurality of the predetermined associations, each predetermined association associating a corresponding cell to at least one of (1) each predetermined navigational node for which a corresponding location is located in the three-dimensional space represented by the cell or (2) at least one predetermined navigational node connected by a predetermined airway to a corresponding location which is located in the three-dimensional space represented by the cell;

calculating, for a first path from the current location to the destination location through a first current neighbor of the plurality of current neighbors, a first value of an objective function, wherein a first cost is assigned to the first path if the first path includes one or more cells containing predetermined navigational nodes, and a second cost different than the first cost is assigned to the first path if the first path does not include one or more cells containing predetermined navigational nodes;

calculating, for a second path from the current location to the destination location through a second current neighbor of the plurality of current neighbors, a second value of the objective function, wherein a third cost is assigned to the second path if the second path includes one or more cells containing predetermined navigational nodes, and a fourth cost different than the third cost is assigned to the second path if the second path does not include one or more cells containing predetermined navigational nodes;

comparing the first value to the second value to determine whether the first path or the second path satisfies an objective condition; and outputting (1) a least one of the first path or the first current neighbor if the first path satisfies the objective condition or (2) at least one of the second path or the second current neighbor if the second path satisfies the objective condition.

13. The method of claim 12, wherein the objective function is a cost function, the first cost is less than the second cost, the third cost is less than the fourth cost, and the method further comprises determining that the first path satisfies the objective condition based on the first value being less than the second value.

14. The method of claim 12, wherein extracting the plurality of cells includes extracting the plurality of cells such that each cell is a region of three-dimensional space immediately adjacent to corresponding neighbor cells.

15. The method of claim 14, wherein extracting the plurality of cells includes executing an airborne E* algorithm.

16. The method of claim 14, wherein extracting the plurality of cells includes using at least one of an Eldetree or a grid.

17. The non-transitory computer-readable medium of claim 12, wherein each of the plurality of predetermined associations associate a corresponding cell to at least one of (1) each predetermined navigational node for which a corresponding location is located in the three-dimensional space represented by the cell or (2) at least one predetermined navigational node connected by a predetermined airway to a corresponding location which is located in the three-dimensional space represented by the cell.

18. A non-transitory computer-readable medium comprising computer-executable instructions which when executed by one or more processors cause the one or more processors to:
- identify a current location and a destination location of an airborne platform;
- identify a current cell in which the current location is located from a plurality of cells, each cell representing a three-dimensional space based on three-dimensional spatial data divided into the plurality of cells;
- identify a plurality of current neighbor cells associated with the current cell, wherein the plurality of current neighbor cells include each cell directly adjacent to the current cell and each cell containing a predetermined navigational node associated to the current cell by a plurality of predetermined associations;
- calculate, for a first path from the current location to the destination location through a first current neighbor of the plurality of current neighbors, a first value of an objective function, wherein a first cost is assigned to the first path if the first path includes one or more cells containing predetermined navigational nodes, and a second cost different than the first cost is assigned to the first path if the first path does not include one or more cells containing predetermined navigational nodes;
- calculate, for a second path from the current location to the destination location through a second current neighbor of the plurality of current neighbors, a second value of the objective function, wherein a third cost is assigned to the second path if the second path includes one or more cells containing predetermined navigational nodes, and a fourth cost different than the third cost is assigned to the second path if the second path does not include one or more cells containing predetermined navigational nodes;
- compare the first value to the second value to determine whether the first path or the second path satisfies an objective condition; and
- output (1) a least one of the first path or the first current neighbor if the first path satisfies the objective condition or (2) at least one of the second path or the second current neighbor if the second path satisfies the objective condition.

19. The non-transitory computer-readable medium of claim 18, wherein the objective function is a cost function, the first cost is less than the second cost, the third cost is less than the fourth cost, and the medium further comprises instructions to cause the one or more processors to determine that the first path satisfies the objective condition based on the first value being less than the second value.

20. The non-transitory computer-readable medium of claim 18, wherein the values of the objective function are calculated further based on at least one of a distance, a time, or a safety.

* * * * *